(12) United States Patent
Ji et al.

(10) Patent No.: US 11,645,110 B2
(45) Date of Patent: May 9, 2023

(54) INTELLIGENT GENERATION AND ORGANIZATION OF USER MANUALS

(71) Applicant: International Business Machines Corporation, Armonk, NY (US)

(72) Inventors: Xiao Feng Ji, Shanghai (CN); Yuan Jin, Shanghai (CN); Li ping Wang, Shanghai (CN); Xiao Rui Shao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 16/351,806

(22) Filed: Mar. 13, 2019

(65) Prior Publication Data

US 2020/0293825 A1 Sep. 17, 2020

(51) Int. Cl.
| | |
|---|---|
| *G06F 9/48* | (2006.01) |
| *G06N 5/022* | (2023.01) |
| *G06N 20/20* | (2019.01) |
| *G06F 9/50* | (2006.01) |
| *G06F 18/214* | (2023.01) |
| *G06N 3/045* | (2023.01) |
| *G06V 10/82* | (2022.01) |

(52) U.S. Cl.
CPC .......... *G06F 9/4881* (2013.01); *G06F 9/5038* (2013.01); *G06F 18/2148* (2023.01);
(Continued)

(58) Field of Classification Search
CPC ..... G06K 9/6257; G06F 9/5038; G06F 40/20; G06F 9/4881; G06N 3/0454; G06N 5/022;
(Continued)

(56) References Cited

U.S. PATENT DOCUMENTS

| | | |
|---|---|---|
| 6,473,730 B1 | 10/2002 | McKeown et al. |
| 9,183,752 B2 | 11/2015 | Nickell et al. |
| (Continued) | | |

FOREIGN PATENT DOCUMENTS

| | | |
|---|---|---|
| CN | 104317786 A | 1/2015 |
| CN | 103345922 B | 7/2016 |
| CN | 106845411 A | 6/2017 |

OTHER PUBLICATIONS

Ng, C. W., & Ranganath, S. (2002). Real-time gesture recognition system and application. Image and Vision computing, 20(13-14), 993-1007. (Year: 2002).*

(Continued)

*Primary Examiner* — Ying Yu Chen
*Assistant Examiner* — Henry Trong Nguyen
(74) *Attorney, Agent, or Firm* — Daniel M. Yeates

(57) ABSTRACT

Aspects of the present disclosure relate to automatically generating a user manual using a technique that includes training a first model with a first set of training data. The technique further includes generating, by the first model, a set of operations and a set of windows, where the set of operations and the set of windows are functions of the program. The technique further includes, generating a plurality of tasks, where a first task comprises a first operation being performed on a first window. The technique further includes determining an order of the plurality of tasks and calculating a level score for the first operation of the first window. The technique further includes assembling the user manual having the plurality of tasks in the determined order.

20 Claims, 9 Drawing Sheets

(52) U.S. Cl.
CPC ............. *G06N 3/045* (2023.01); *G06N 5/022* (2013.01); *G06N 20/20* (2019.01); *G06V 10/82* (2022.01)

(58) Field of Classification Search
CPC ........ G06N 20/20; G06N 3/126; G06N 5/003; G06N 5/025; G06N 7/005; G06N 3/08; G06N 3/0445; G06N 3/0481; G06N 20/10; G06V 10/82
See application file for complete search history.

(56) References Cited

U.S. PATENT DOCUMENTS

2009/0037801 A1   2/2009   Ye et al.
2016/0162456 A1*  6/2016   Munro ................... G06N 20/00
                                                               704/9
2018/0018166 A1   1/2018   Unno
2018/0365025 A1*  12/2018  Almecija ............... G06N 20/00

OTHER PUBLICATIONS

Jaderberg, M., Mnih, V., Czarnecki, W. M., Schaul, T., Leibo, J. Z., Silver, D., & Kavukcuoglu, K. (2016). Reinforcement learning with unsupervised auxiliary tasks. arXiv preprint arXiv:1611.05397. (Year: 2016).*
Lestoc, C., "5 best software to create step-by-step instructions and tutorials", Windowsreport, Feb. 8, 2018, 11 pages.
Mell et al., "The NIST Definition of Cloud Computing", Recommendations of the National Institute of Standards and Technology, Sep. 2011, 7 pages.

* cited by examiner

| In login page (A) | Input user name | Input password | Click on button 'submit' | In main window (B) | Click menu 'File' | In 'File' menu list (C) | Click menu item 'Save as' | In 'Save File' dialog (D) | Input file name | Input path | Click on button 'Save' | In 'Confirm saving' dialog (E) | Click on button 'OK' |
|---|---|---|---|---|---|---|---|---|---|---|---|---|---|

FIG. 5A

INTELLIGENT GENERATION AND ORGANIZATION OF USER MANUALS

BACKGROUND

The present disclosure relates to artificial intelligence, and, more specifically, to using deep learning to automatically generate documents.

Computer software is a set of computer instructions that guide a processor to select, manipulate, and output data. Software products are continuously being developed, released, and updated. Generally, when software is sold, developers prepare a user manual to accompany their product. As the complexity and features available in software have increased, so has the complexity and length of the user manuals.

SUMMARY

Disclosed is a method for automatic and intelligent generation of a user manual the method comprising receiving a set of training data into a first neural network. The method further includes, training a first model with a first set of training data. The method further includes selecting a program for which to generate a user manual. The method further includes determining, by the first model in association with the program, a set of operation and a set of windows, wherein the set of operation and the set of windows are functions of the program. The method further includes generating, by the first model, a plurality of tasks, wherein a first task comprises a first operation from the set of operations, the first operation being performed on a first window from the set of windows. The method further includes determining, by the first model, an order to organize the plurality of tasks, and calculating a level score for the first operation of the first window for the first task. The method further includes, assembling the user manual, wherein the user manual comprises the plurality of tasks in the order and the first operation of the first task is at the level determined by the level score. The method further includes outputting the user manual. A system and a computer program product configured to carry out the above method is also disclosed.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5A depicts a plurality of tasks and their associated actions, in accordance with various embodiments of the present disclosure.

Figure 1:
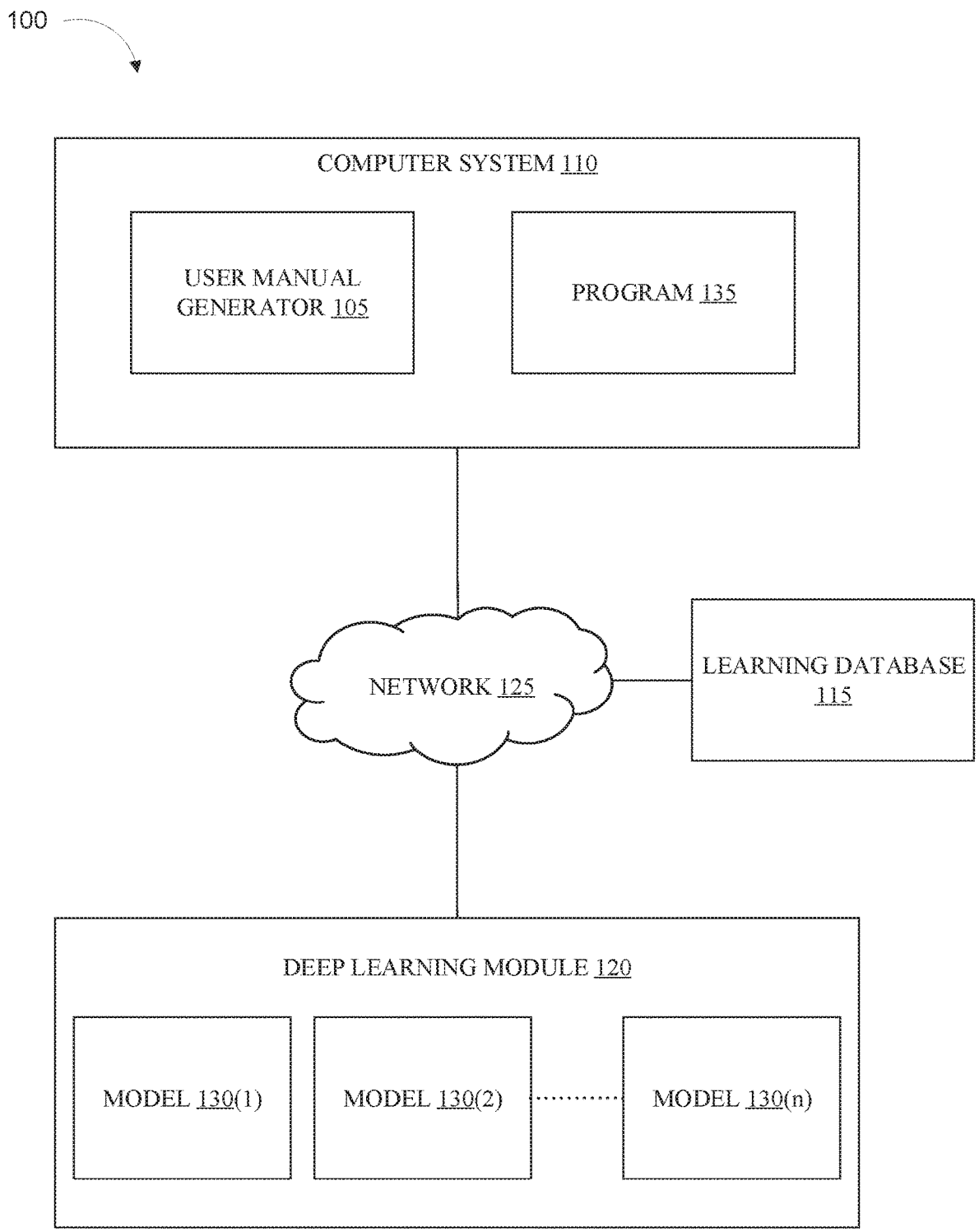
FIG. 1 illustrates a functional diagram of a computing environment suitable for operation of a user manual generator, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to artificial intelligence, and, more specifically, to using deep learning to automatically generate documents. Aspects of the present disclosure can be better appreciated in light of the aforementioned applications.

Computer software is a set of computer instructions that guide a processor to select, manipulate, and output data. Software products are continuously being developed, released, and updated. Generally, when software is sold, developers prepare a user manual to accompany their product. As the complexity and features available in software have increased, so has the complexity and length of the user manuals.

User manuals teach a user how to utilize the functionality of a program. Teaching the functionality can involve, as an example, taking multiple screen shots of the program and describing what each screen shot shows. Teaching the functionality can also include adding identifiers (e.g., arrows, boxes) to the screen shots to show the user where an action is being performed. Organizing the user manual can involve, as an example, deciding which portions come first, when to cross reference to other sections of the manual, and/or when to repeat describing certain functions.

Embodiments of the present disclosure are directed toward automatic and intelligent generation and organization of software user manuals by a user manual generator. In various embodiments, the user manual generator utilizes artificial intelligence (AI). In some embodiments, the AI includes deep learning algorithms (or a deep learning system). In various embodiments, the user manual generator can utilize one or more AI models to recognize functionality of a software program and generate instructions so a user can utilize the functionality of the program by following the generated instructions. In various embodiments, the user manual generator can utilize one or more AI models to intelligently organize the instructions. The models can include identifying user operations (e.g., clicks, inputs, selecting menu items, etc.), identifying various user interface windows (e.g., save files, open files, logins, etc.), and organization of all operations. The models can further include linking different operations to different user interfaces (UI) according to an order of operations. In some embodiments, the generating software is trained to intelligently organize the actions and the interfaces. In some embodiments, the manual generator can output a user manual depicting how to perform all the actions in the software. In various embodiments, the output is tunable (e.g., customizable).

The current process of making a software user manual is inconvenient and can be time consuming. It can require both describing the functions of the software and organizing each the descriptions in a logical manner. Additionally, users of software manuals expect to see demonstration videos in place of, or in addition to, textual explanations.

Generally, when producing a user manual, both textual and video versions are generated separately. For a textual manual, the producer needs to write down the operations, perform the operation, screen shot the operation, paste the screenshot into the written portion, and add a caption to the screen shot. Then, if a demonstration video is also produced, the producer must re-perform the operations while recording the screen, then edit the video. Embodiments of the current disclosure can eliminate the duplicate work load and create multiple versions of a user manual at the same time.

Manually creating user manuals requires the producer to exert a large amount of time and energy organizing the content of the manual (e.g., which order to place operations, when to display a duplicate image/instruction, etc.). In some cases, having a manually properly organized is correlated to the quality and ease of use of the manual. Embodiments of the present disclosure can intelligently organize and structure a user manual, thereby saving time and effort in generating a manual.

Embodiments of the present disclosure allow for customizable settings in generating a user manual. The number of images/videos, the amount of textual description, and/or the complexity of the description (e.g., directed to a programmer vs. a first-time computer user), can be selected prior to the manual being generated. This allows for flexibility in generating manuals based on the needs of the customers.

In various embodiments, a user manual is generated by receiving a set of training data, and training one or more models (e.g., AI models) with the training data. In some embodiments, the models include neural networks. In some embodiments, a program is selected for which to generate the user manual and the one or more models determine a set of operations (or user interface (UI) operations) that can be performed by the users and a set of windows (UI windows) the user will see when performing various operations. In some embodiments, a plurality of tasks are generated, where a task includes at least one operation on at least one window. In some embodiments, the one or more models are used to determine an optimal organization for the plurality of tasks. In some embodiments, the one or more models determines the number of levels in the manual and a level score for each action in a task. The level is an organization tool (e.g., volume, chapter, section, etc.). The level score determines a respective level for each action in a task.

The aforementioned advantages are example advantages, and embodiments exist that can contain all, some, or none of the aforementioned advantages while remaining within the spirit and scope of the present disclosure.

Referring now to various embodiments of the disclosure in more detail, FIG. 1 is a representation of a computing environment, generally labeled 100, that is capable of running a user manual generator 105, in accordance with one or more embodiments of the present disclosure. Many modifications to the depicted environment can be made by those skilled in the art without departing from the scope of the disclosure as recited by the claims.

Computing environment 100 includes computer system 110, learning database 115, deep learning module 120, and network 125. Network 125 can be, for example, a telecommunications network, a local area network (LAN), a wide area network (WAN), such as the Internet, or a combination of the three, and can include wired, wireless, or fiber optic connections. Network 125 can include one or more wired and/or wireless networks that are capable of receiving and transmitting data, voice, and/or video signals, including multimedia signals that include voice, data, and video information. In general, network 125 can be any combination of connections and protocols that will support communications between computer system 110, learning database 115, deep learning module 120, and other computing devices (not shown) within computing environment 100.

Computer system 110 can be a standalone computing device, a management server, a web server, a mobile computing device, or any other electronic device or computing system capable of receiving, sending, and processing data. In other embodiments, computer system 110 is a server computing system utilizing multiple computers as a server system, such as in a cloud computing environment. In some embodiments, computer system 110 is a computing system utilizing clustered computers and components (e.g., database server computers, application server computers, etc.) that act as a single pool of seamless resources when accessed within computing environment 100. Computer system 110 includes user manual generator 105 and program 135. Computer system 110 can include internal and external hardware components, as depicted and described in further detail with respect to FIG. 6. In various embodiments, the combination of hardware and software in computer system 110 are capable of running user manual generator 105.

Program 135 can be any software program for which a user manual can be produced. In some embodiments, user manual generator 105 generates a user manual for program 135. In various embodiments, program 135 is one or more programs for which a user manual can be developed. In various embodiments, program 135 is any program that can be run on a computing device (e.g., accounting software, photo-editing software, video editing software, computational software, computer security software, word processing software, operating system software, database management software, etc.). In some embodiments, program 135 can be on a computing device independent from computer system 110.

Learning database 115 can be any combination of hardware and/or software capable of storing and organizing training data. In some embodiments, the training data includes software user manuals. In some embodiments, the user manuals stored in learning database 115 can be used to train the AI models. In various embodiments, learning database 115 can be updated manually (e.g., a user manually inputs manuals into the database) or automatically (e.g., the learning database can search a network (e.g., internet) and find user manuals and automatically download the manual). In some embodiments, manuals can be removed from learning database 115. In various embodiments, learning database 115 can be included in computer system 110, user manual generator 105, deep learning module 120, and/or other computing devices (not shown) in computing environment 100.

Deep learning module 120 can be any combination of hardware and/or software capable of utilizing machine learning and artificial intelligence to process and analyze data. In some embodiments, deep learning module 120 includes one or more processors and/or neural networks. Although shown separately from the other components in FIG. 1, deep learning module 120 can, in various other embodiments, be included in user manual generator 105, computer system 110, learning database 115 or other computing devices (not shown) capable of operating in computing environment 100.

In some embodiments, deep learning module 120 uses the data in learning database 115 to train and update the one of the neural networks.

Deep learning module 120 can include a plurality of models 130(1), 130(2), . . . 130(n), which are collectively referred to as models 130. In some embodiments deep learning module 120 includes model 130(1), model 130(2), up to model 130(n), where "n" is an integer index. Models 130 can use one or more neural networks in training and processing data. In some embodiments, models 130 include neural networks as part of their machine learning and AI processes. In some embodiments, each model 130 is used for generating a different aspect of a user manual for program 135. For example, a first model can identify various interfaces (e.g., windows) of the program, a second model can identify actions on the various interfaces, and a third model can identify and generate intelligent organization of actions. In some embodiments, one or more od the models 130 is a recurrent neural network (RNN) such as, for example, a Long Short-Term Memory (LSTM) neural network.

Figure 2:
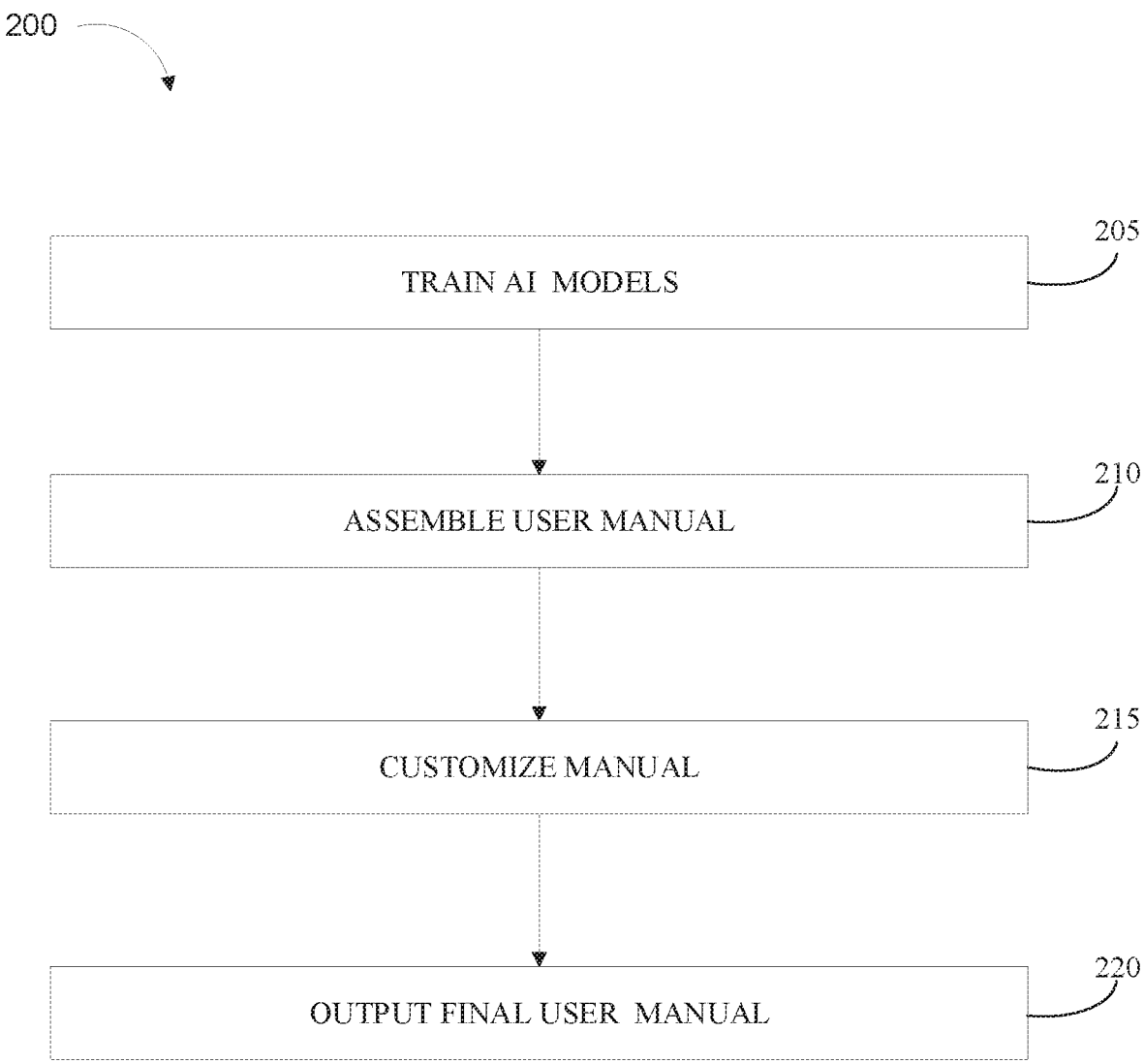
FIG. 2 is a flowchart depicting an example method for generating a user manual, in accordance with various embodiments of the present disclosure.

FIG. 2 depicts a flowchart of an example method for generating a software user manual that can be performed in a computing environment (e.g., computing environment 100 and/or computer system 110). One or more of the advantages and improvements described above can be realized by the method 200, consistent with various embodiments of the present disclosure.

Method 200 can include more or fewer operations than those depicted. Method 200 can include operations in different orders than the order depicted. Likewise, the method 200 can include operations that occur simultaneously rather than sequentially. Many modifications to the depicted method can be made by those skilled in the art without departing from the spirit and scope of the present disclosure. Method 200 can be implemented by one or more processors, software and/or hardware configured to generate user manuals (e.g., user manual generator 105 of FIG. 1), a host computing device (e.g., computer system 110 of FIG. 1), or a different combination of hardware and/or software. In various embodiments, the various operations of method 200 are performed by user manual generator 105, computer system 110, deep learning module 120, and/or other computing devices capable of operation in computing environment 100.

At operation 205, one or more AI models (e.g., models, machine learning models, etc.) are trained. In some embodiments, the AI models are trained using machine learning algorithms. In some embodiments, the learning algorithms can be processed by one or more of deep learning module 120, user manual generator 105, and/or computing device 110. In some embodiments, the models are trained by executing any number of machine learning algorithms such as, but not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. In some embodiments, the machine learning utilizes one or more neural networks to train the models. The operation of neural networks is discussed in further detail below in relation to FIG. 3.

In some embodiments the models are trained using a set of training data. In some embodiments, the training data is stored in a training database (e.g., learning database 115). In some embodiments, the training data can be manually and/or automatically updated. In various embodiments, after each time new data is added to the training database, the models can re-train to incorporate the new data.

In various embodiments, the training data can include a plurality of programs and their associated user manuals, previous versions of the software and user manuals, and/or any software and associated user manuals. In some embodiments, the training data includes any other relevant data (e.g., data on organizational principles, user/software interaction, etc.).

In some embodiments, a first model can classify UI operation (or operations), a second model can classify UI windows (or UI categories, or windows), and a third model can organize content structure. In various embodiments, one or more unique sets of training data can be used in the training of each model. In some embodiments, one or more of the same sets of training data can be used to train each model. Examples of UI operations can include, but are not limited to, click a button, input text, select a radiobox, select a checkbox, select an option in a combobox, open a menu, select a menu item, etc. Examples of UI windows include but are not limited to login, administration, configuration (e.g., settings), profile, reporting, forms, access request, etc. Each UI window can be a respective view, dialog box, webpage, or similar interface on which a user can take one or more actions (e.g., execute UI operations).

In various embodiments, the models are trained by analyzing available user manuals. In some embodiments, the models use natural language processing to determine the semantics and syntax that are used in user manuals. In some embodiments, the models use image recognition to determine when there are figures (e.g., screenshots) that are used to support text instructions. In some embodiments, the models use older versions of the user manual to determine changes between the software versions.

In some embodiments, optical character recognition (OCR) is used to analyze the training data. OCR converts printed text and images into a machine-readable format. In some embodiments, Named Entity Recognition (NER) is used to analyze the training data. NER is a process that can locate and classify a string of characters into a predefined category (e.g., categorizing "upload document" as a task). In some embodiments, natural language processing (NLP) is used to analyze the training data.

At operation 210, a user manual is assembled (e.g., operations of all windows are identified and organized). In some embodiments, the assembled user manual is generated containing every task, operation, screenshot, and instruction text. In these embodiments, the user manual can be customized according to user preferences. In some embodiments, the user manual is compiled by running a program (e.g., program 135 of FIG. 1) through the one or more models trained in operation 205. In some embodiments, the program is run through the models by a user. In some embodiments, the program is run through the models by a computing device (e.g., computing device 110). In some embodiments, the user manual is compiled as described in FIG. 4.

At operation 215, the user manual is customized. In some embodiments, the final contents of the user manual are adjusted based on the needs of the users. For example, if one user is familiar with a target system, the user manual can be customized to a higher level of detail compared to a user who is not familiar with the target system. In some embodiments, the manual generated for a familiar user can omit various sections/steps that are known to the user. In some embodiments, two or more versions of the manual can be generated, with each version being customized differently. In some embodiments, a user can provide input on the customization (e.g., selecting options of what to include/exclude). In various embodiments, users can select to have one or more of videos, screenshots, audible instructions, and/or written instructions for each of the various operations. In some embodiments, the customization includes adding/removing individual tasks from the assembled user manual. In some embodiments, the customization includes adding/removing screenshots from the assembled user manual.

In some embodiments, the user manual is customized by a customization policy. In various embodiments, the customization policy allows a user to select portions of the assembled manual to omit. In various embodiments, the omissions can be based on a level of familiarity with the program (e.g., familiar, unfamiliar, etc.), content preferences (e.g., exclude all screenshots), operation type (e.g., open new window), windows (e.g., exclude setting pages), tasks (e.g. remove login tasks), etc. In some embodiments, the user manual is processed through one or more of the models after the customization selections. This can result in formatting changes (e.g., reorder operations, changes to level designations, etc.).

At operation 220, the customized user manual is output. In various embodiments, the manual is output in a readable format (e.g. .docx, .pdf). In some embodiments, the user manual is output by being published (e.g., physically published or electronically uploaded and distributed). In some embodiments, the user manual is output by being saved as a file on a computing system (e.g. computer system 110 of FIG. 1). In some embodiments, the user manual is added to the training data after being output.

Figure 3:
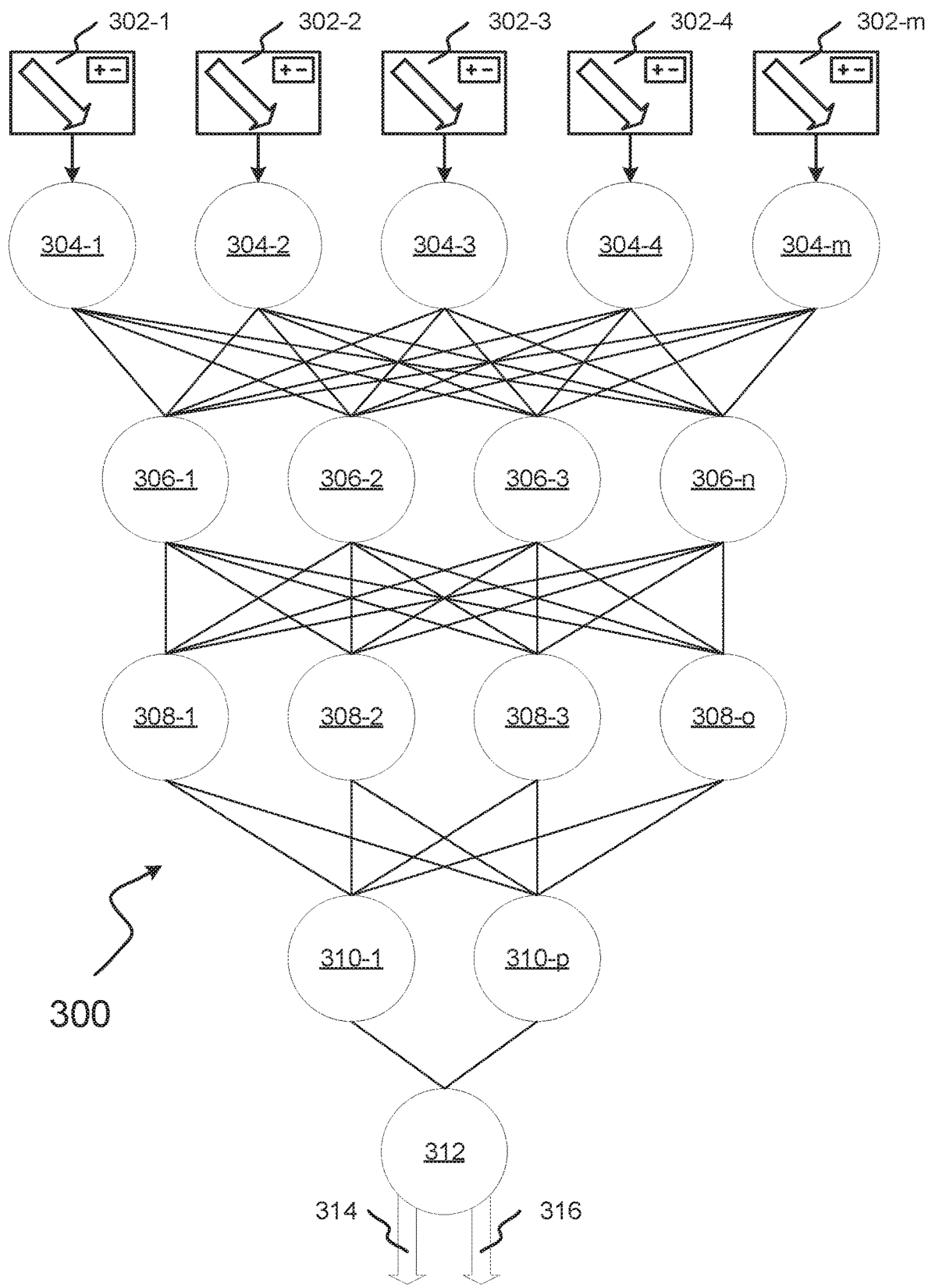
FIG. 3 depicts an example neural network that can be specialized to generate a user manual, in accordance with embodiments of the present disclosure.

FIG. 3 depicts an example neural network 300 that can be specialized to train one or more models that can be used to generate a software user manual. For example, neural network 300 can be specialized to process the training data as discussed in operation 205 of FIG. 2.

Neural network 300 can be a classifier-type neural network, or convolutional neural network. Neural network 300 can be part of a larger neural network. For example, neural network 300 can be nested within a single, larger neural network, connected to several other neural networks, or connected to several other neural networks as part of an overall aggregate neural network.

Inputs 302-1 through 302-m represent the inputs to neural network 300. In this embodiment, inputs 302-1 through 302-m do not represent different inputs. Rather, inputs 302-1 through 302-m represent the same input that is sent to each first-layer neuron (neurons 304-1 through 304-m) in neural network 300. In some embodiments, the number of inputs 302-1 through 302-m (i.e., the number represented by m) can equal (and thus be determined by) the number of first-layer neurons in the network. In other embodiments, neural network 300 can incorporate 1 or more bias neurons in the first layer, in which case the number of inputs 302-1 through 302-m can equal the number of first-layer neurons in the network minus the number of first-layer bias neurons.

In some embodiments, a single input (e.g., input 302-1) can be input into the neural network. In such an embodiment, the first layer of the neural network can comprise a single neuron, which can propagate the input to the second layer of neurons. In some embodiments, the inputs 302-1 through 302-m are each a unique user manual stored as training data, and/or the associated software.

Inputs 302-1 through 302-m can comprise one or more values correlating to data about software user manuals. These values can represent, operations, windows, organization, and/or any other relevant data. For example, for the organization model, the inputs can be divided into smaller inputs such as, number of levels, number of consecutive operations per level, etc. Neural network 300 comprises 5 layers of neurons (referred to as layers 304, 306, 308, 310, and 312, respectively corresponding to illustrated nodes 304-1 to 304-m, nodes 306-1 to 306-n, nodes 308-1 to 308-o, nodes 310-1 to 310-p, and node 312). In some embodiments, neural network 300 can have more than 5 layers or fewer than 5 layers. Each layer can each comprise the same amount of neurons as any other layer, more neurons than any other layer, fewer neurons than any other layer, or more neurons than some layers and fewer neurons than other layers.

In this embodiment, layer 312 is treated as the output layer. Layer 312 can output a probability (e.g., likelihood a particular action will be found in a particular level)For example, layer 312 can output the probability that an operation should be placed in a particular level. In this illustration no bias neurons are shown in neural network 300. However, in some embodiments each layer in neural network 300 can contain one or more bias neurons. Although layer 312 is shown having one neuron (node 312), in other embodiments, layer 312 contains more than 1 neuron.

Layers 304-312 can each comprise an activation function. The activation function utilized can be, for example, a rectified linear unit (ReLU) function, a SoftPlus function, a Soft step function, or others. Each layer can use the same activation function, but can also transform the input or output of the layer independently of, or dependent upon, the ReLU function. This is also true in embodiments with more or fewer layers than are illustrated here.

Layer 312 is the output layer. In this embodiment, neuron 312 produces outputs 314 and 316. Outputs 314 and 316 represent complementary probabilities that a target event will or will not occur. For example, output 314 can represent the probability an operation is performed on a window, or that an operation is the nth step in a task. In some embodiments, outputs 314 and 316 can each be between 0.0 and 1.0, and can add up to 1.0. In such embodiments, a probability of 1.0 can represent a projected absolute certainty (e.g., if output 314 were 1.0, the projected chance that the target event would occur would be 100%, whereas if output 316 were 0.0, the projected chance that the target event would not occur would be 100%).

Figure 4:
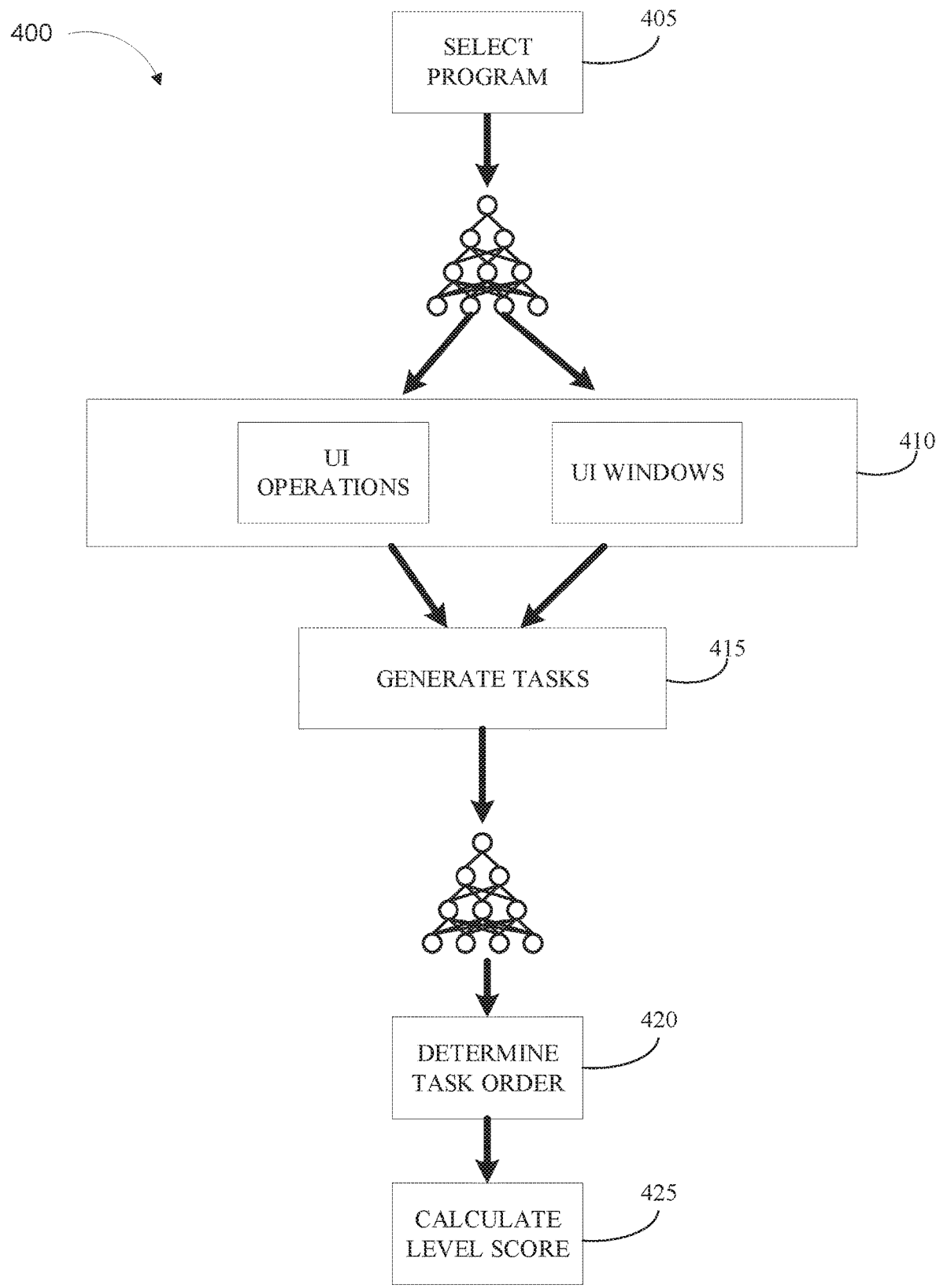
FIG. 4 is a flowchart depicting an example method for assembling a user manual, in accordance with various embodiments of the present disclosure.

FIG. 4 depicts a flowchart of an example method 400 for generating a software user manual that can be performed in a computing environment (e.g., computing environment 100 and/or computer system 110). One or more of the advantages and improvements described above can be realized by FIG. 4 consistent with various embodiments of the present disclosure.

Method 400 can include more or fewer operations than those depicted. Method 400 can include operations in different orders than the order depicted. Likewise, the method 400 can include operations that occur simultaneously rather than sequentially. Many modifications to the depicted method can be made by those skilled in the art without departing from the spirit and scope of the present disclosure. Method 400 can be implemented by one or more processors, software and/or hardware configured to generate user manuals (e.g., user manual generator 105 of FIG. 1), a host computing device (e.g., computer system 110 of FIG. 1), or a different combination of hardware and/or software. In various embodiments, the various operations of method 400 are performed by user manual generator 105, computer system 110, deep learning module 120, and/or other computing devices capable of operation in computing environment 100. In some embodiments, the method 400 is a more detailed view of operation 210 of FIG. 2. In some embodiments, method 400 is a portion of operation 210 of FIG. 2.

At operation 405, a program is selected for which to generate a user manual. In some embodiments, selecting the program includes customization (e.g., select level of detail, frequency of screenshots, tasks to omit, etc.).

At operation 410, the operations (UI operations) and windows (UI windows) are determined. In some embodiments, the operation and windows are determined by utilizing one or more trained models. In some embodiments, the selected program is processed through the one or more trained models. In some embodiments, the trained models are one or more of the models trained in operation 205 of FIG. 2.

In some embodiments, there are at least two models used in operation 410. In some embodiments, the two models are configured to respectively identify UI windows and UI operations of the program selected in operation 405. In some embodiments, the models identify all of the potential UI operations and all of the UI windows.

At operation 415, a plurality of tasks are generated based on the UI windows and UI operations identified in operation 410. A task includes one or more operations on one or more windows to perform some functionality of the program. An operation can be clicking save, but that is one part of the task of generating and saving a report. Some examples of tasks can be generating documents, exporting documents, recovering data, scheduling, etc. For example, to complete the task to "generate a report" a user can perform four different actions on four interfaces (e.g., the processing flow could have a form represented as 1A, 2B, 3C, 4D). In some embodiments, each task includes at least one screen shot of a window associated with the task. In some embodiments, each operation includes a screenshot of the window associated with the operation.

At operation 420, the order of the tasks is determined. In some embodiments, the order of the tasks is determined by utilizing one or more trained models. In some embodiments, the selected program is processed through the one or more trained models. In some embodiments, the trained models are one or more of the models trained in operation 205 of FIG. 2.

In various embodiments, the order is based on one or more models. In some embodiments, the order is based on the AI determination of what tasks and/or operations will be most commonly used. In some embodiments, the order is based on complexity of the tasks, (e.g., simpler tasks first). In some embodiments, the order is based on commonly used functions of a program (e.g., several large tasks use the same smaller task).

In some embodiments, the user manual is organized into one or more levels (e.g., multilevel documents). A level can be a way to organize related actions. Some non-limiting examples of different levels are: chapter, heading, and section (Chapter 1, heading A, section 1). The number of levels can be determined based on the results of operation 405 and/or operation 410.

At operation 425, level scores are calculated. In some embodiments, each action determined in operation 410 has a unique level score. In various embodiments the output of the model is a level score. A level score is a determination of the level in which each task and/or sub-task (sub-task is an induvial action of a task) should be placed. In some embodiments, the level in which the action is placed is correlated to the level score. For example, if the level score for a particular action is [0.1, 0.1, 0.2, 0.6], this action would be placed in level 4 because the level score for level 4 is the largest (0.6) compared to the other level scores.

In some embodiments, the level score is a set of probabilities. In these embodiments, the number in the set of probabilities is equal to the number of levels of the user manual. For example, if the system determines the user manual should have 4 levels, the output of the model will look like [0.1, 0.1, 0.2, 0.6], where the sum of the parts equals 1. In various embodiments, the level score for previous tasks and/or operations are a factor in calculating level scores (e.g., if an operation is a level 2, and the next operation is part of the same task, the previous score will likely increase the probability the next operation will be in the same level).

Figures 5B, 5C:
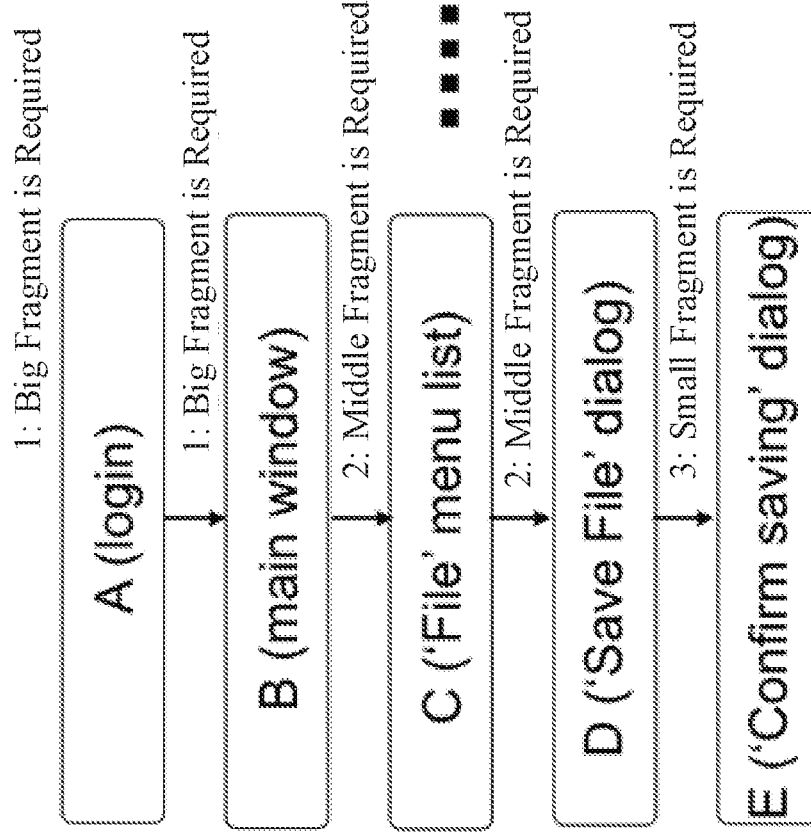
FIG. 5B depicts the plurality of tasks with the level designators, in accordance with various embodiments of the present disclosure.
FIG. 5C depicts a portion of an assembled user manual, in accordance with various embodiments of the present disclosure.

FIGS. 5A, 5B, and 5C depict visual representations of example outputs of the user manual generator 105 consistent with various embodiments of the present disclosure. FIG. 5A shows a list of UI windows (bold) with UI operations (not bold) that can be performed in those windows. In various embodiments, FIG. 5A can be generated during operation 210 of method 200 and/or operation 410 of method 400. In some embodiments, the results of FIG. 5A are generated as a result of processing a program through one or more AI models. In some embodiments, the results of FIG. 5A are generated by the UI operations model and the UI windows model. In FIG. 5A, the order in which the operations are shown do not necessarily represent the order they will be placed in the generated user manual. Although five windows and nine operations are shown in FIG. 5A, various embodiments can have any number of windows and configurations, such as hundreds or thousands of windows and/or configurations.

FIG. 5B shows the windows from FIG. 5A in an order with associated level designations. In FIG. 5B, big fragment, middle fragment, small fragment are used to represent level 1, level 2, level 3, as an example. In various embodiments, FIG. 5B can be generated during operation 210 of method 200 and/or operation 410-420 of method 400. In some embodiments, the results of FIG. 5B are generated as a result of processing a program through one or more AI models. In some embodiments, FIG. 5B is generated by the organization model. In FIG. 5B, the arrows between windows represent the order in which various windows will appear in the final manual. In various embodiments, the order is determined during operation 410 and/or operation 420 of method 400.

FIG. 5C depicts a completed portion of a user manual. FIG. 5C shows the windows and operations determined in FIG. 5A arranged in an order based on the levels determined in FIG. 5B. Although not explicitly shown in FIG. 5C, the completed user manual contains screen shots, videos and/or other media, in accordance with embodiments of the present disclosure.

Figure 6:
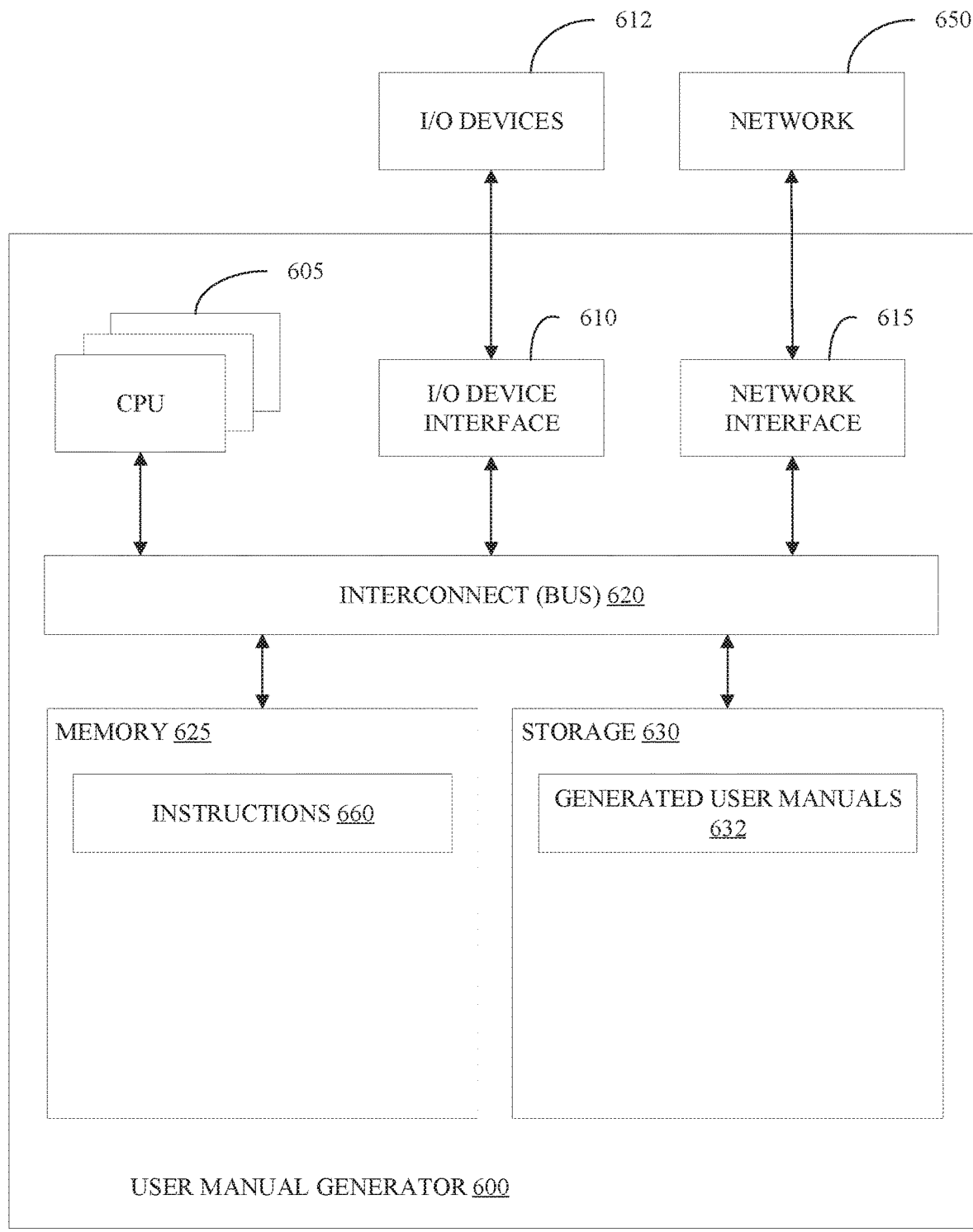
FIG. 6 illustrates a block diagram of an example user manual generator, in accordance with some embodiments of the present disclosure.

FIG. 6 illustrates a block diagram of an example user manual generator 600 in accordance with some embodiments of the present disclosure. In some embodiments user manual generator 600 can perform the methods 200, 300, and/or 400 as described in FIGS. 2-4. In some embodiments, user manual generator 600 provides instructions for any of the methods 200, 300, and/or 400 of FIGS. 2-4 to a client machine such that the client machine executes the method, or a portion of the method, based on the instructions provided by the user manual generator 600.

The user manual generator 600 includes a memory 625, storage 630, an interconnect (e.g., BUS) 620, one or more CPUs 605 (also referred to as processors 605 herein), an I/O device interface 610, I/O devices 612, and a network interface 615.

Each CPU 605 retrieves and executes programming instructions stored in the memory 625 or storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in some embodiments. In some embodiments, a CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a nonvolatile memory, such as a hard disk drive, solid state device (SSD), removable memory cards, optical storage, or flash memory devices. In an alternative embodiment, the storage 630 can be replaced by storage area-network (SAN) deices, the cloud, or other devices connected to the user manual generator 600 via the I/O device interface 610 or a network 650 via the network interface 615.

In some embodiments, the memory 625 stores instructions 660 and generated user manuals 632 are stored in storage 630. However, in some embodiments, the instructions 660 and generated user manuals 632 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all of, any of the methods 200, 300, and/or 400 of FIGS. 2-4.

Generated user manuals 632 can be any storage data structure generated by user manual generator 600.

In some embodiments, the I/O devices 612 include an interface capable of presenting information and receiving input. For example, I/O device 612 can present information to a user interacting with user manual generator 600 and receive input from the user.

User manual generator 600 is connected to the network 650 via the network interface 615. Network 650 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instruction can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instruction can also be stored in a computer readable storage medium that can direct a computer, a programmable data processing apparatus, and/or other devices to function in a particular manner, such that the computer readable storage medium having instructions stored therein comprises an article of manufacture including instructions which implement aspect of the function/ act specified int eh flowchart and/or block diagram block or blocks.

The computer readable program instruction can also be loaded onto a computer, other programmable data processing apparatus, or other device to cause a series of operations steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIGS. 2-4) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
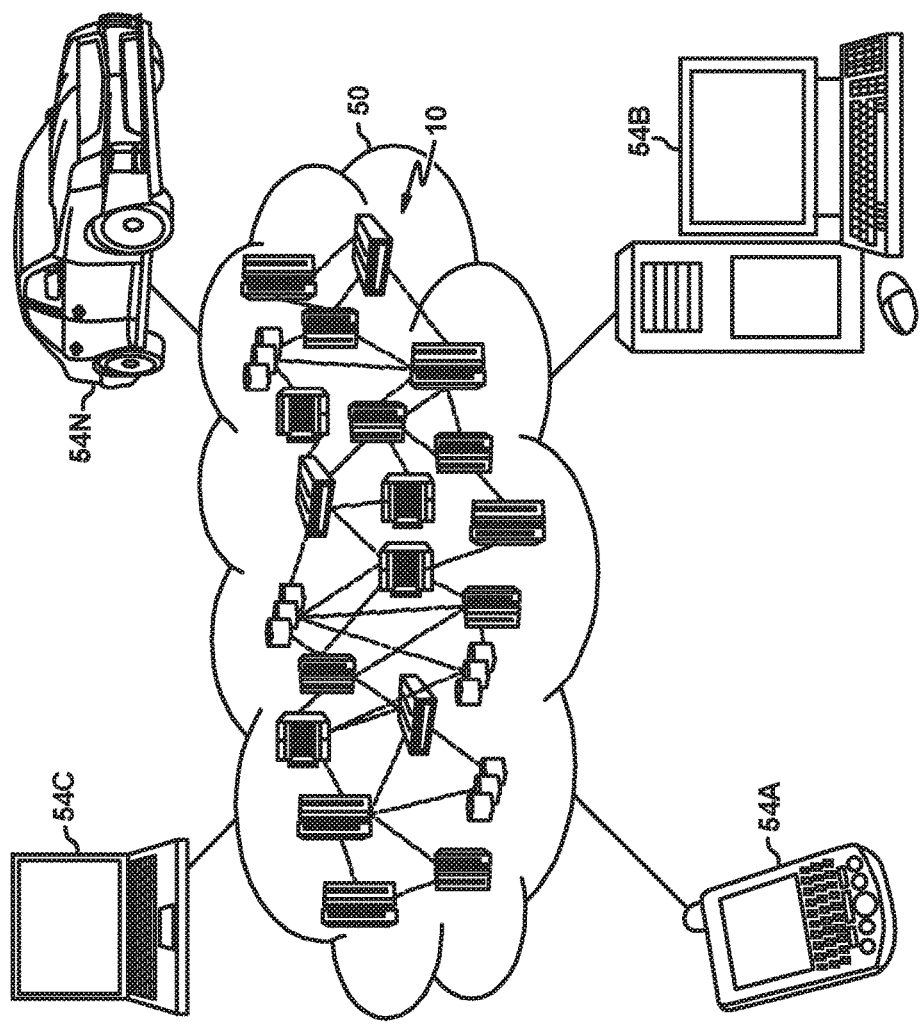
FIG. 7 illustrates a cloud computing environment in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
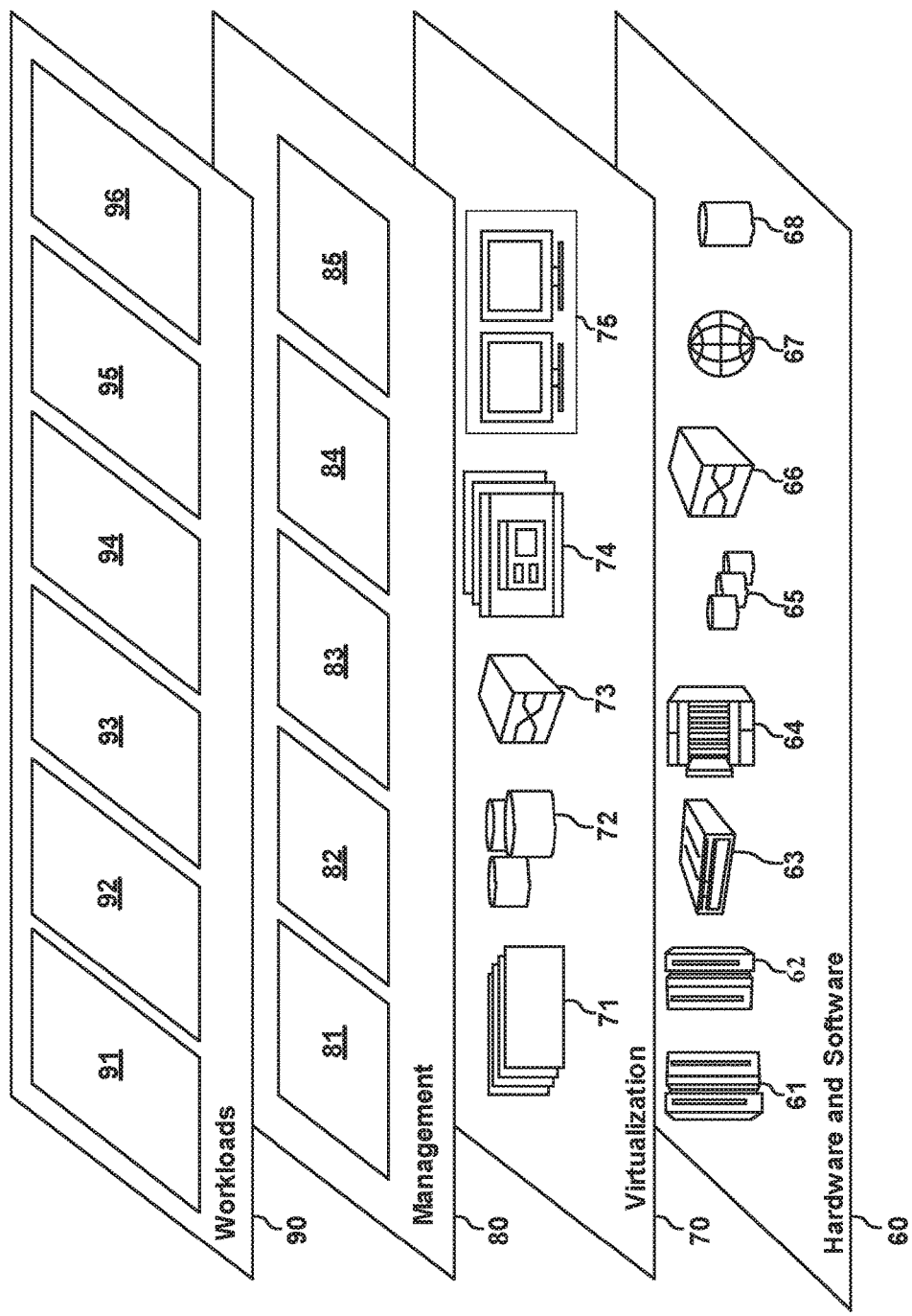
FIG. 8 depicts abstraction model layers in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; machine learning 93; data analytics processing 94; transaction processing 95; and user manual generation 96.

What is claimed is:

1. A computer implemented method for generating a user manual, the method comprising:

receiving, by a processor, a first set of training data into a first neural network;

training a first model with the first set of training data;

selecting a program for which to generate a user manual, wherein the user manual is configured to teach functions of the program;
determining, by the first model in association with the program, a set of operations and a set of windows, wherein the set of operations and the set of windows are functions of the program;
analyzing the program by the first model;
generating, by the first model and in response to the analyzing the program, a plurality of tasks, wherein a first task includes a first operation from the set of operations, the first operation being performed on a first window from the set of windows;
determining, by the first model, an order to organize the plurality of tasks;
providing the set of windows and the plurality of task in the order on a user interface;
calculating, by the first model, a level score for the first operation of the first window for the first task;
assembling the user manual, wherein the user manual comprises the plurality of tasks in the order and the first operation of the first task is at a level based on the level score; and
outputting the user manual, wherein the user manual includes at least two levels.

2. The computer implemented method of claim 1, wherein the first model is trained to identify the set of operations in the program, the method further comprising:
training a second model, wherein the second model is trained by a second set of training data, wherein the second model is trained to identify the set of windows.

3. The computer implemented method of claim 2, further comprising:
training a third model, wherein the third model is trained by a third set of training data, wherein the third model is trained to determine the order for the plurality of tasks and to calculate the level score for the first operation.

4. The computer implemented method of claim 1, wherein the first model is trained to identify the set of operations in the program.

5. The computer implemented method of claim 1, wherein the first model is trained to identify the set of windows.

6. The computer implemented method of claim 1, wherein the first model is trained to calculate the level score for the first operation of the first task.

7. The computer implemented method of claim 1, further comprising:
removing, from the user manual, one or more tasks from the plurality of tasks.

8. The computer implemented method of claim 1, wherein the first task further comprises a screenshot of the first window.

9. The computer implemented method of claim 1, wherein the first operation is selected from the group consisting of: clicking a button, inputting text, selecting a radiobox, selecting a checkbox, selecting an option in a combobox, opening a menu, and selecting a menu item.

10. The computer implemented method of claim 1, wherein the first window is selected from the group consisting of: login, settings, user profile, reporting, save file, open file, and access request.

11. A system comprising:
receiving, by a processor, a first set of training data into a first neural network;
training a first model with the first set of training data;
selecting a program for which to generate a user manual, wherein the user manual is configured to teach functions of the program;
determining, by the first model in association with the program, a set of operations and a set of windows, wherein the set of operations and the set of windows are functions of the program;
analyzing the program by the first model;
generating, by the first model and in response to the analyzing the program, a plurality of tasks, wherein a first task includes a first operation from the set of operations, the first operation being performed on a first window from the set of windows;
determining, by the first model, an order to organize the plurality of tasks;
providing the set of windows and the plurality of task in the order on a user interface;
calculating, by the first model, a level score for the first operation of the first window for the first task;
assembling the user manual, wherein the user manual comprises the plurality of tasks in the order and the first operation of the first task is at a level based on the level score; and
outputting the user manual, wherein the user manual includes at least two levels.

12. The system of claim 11, wherein the first model is trained to identify the set of operations in the program, and the program instructions are further configured to cause the processor to perform operations further comprising:
training a second model wherein the second model is trained by a second set of training data, wherein the second model is trained to identify the set of windows.

13. The system of claim 12, wherein the program instructions are further configured to cause the processor to perform operations further comprising:
training a third model, wherein the third model is trained by a third set of training data, wherein the third model is trained to determine the order for the plurality of tasks and to calculate the level score for the first operation.

14. The system of claim 11 wherein the first model is trained to calculate the level score for the first operation of each of the plurality of tasks.

15. The system of claim 11, wherein the program instructions are further configured to cause the processor to perform operations further comprising:
removing, from the user manual, one or more tasks from the plurality of tasks.

16. A computer program product, the computer program product comprising a computer readable storage medium having program instructions embodied therewith, the program instructions executable by a processing unit to cause the processing unit to perform a method comprising:
receiving, by a processor, a first set of training data into a first neural network;
training a first model with the first set of training data;
selecting a program for which to generate a user manual, wherein the user manual is configured to teach functions of the program;
determining, by the first model in association with the program, a set of operations and a set of windows, wherein the set of operations and the set of windows are functions of the program;
analyzing the program by the first model;
generating, by the first model and in response to the analyzing the program, a plurality of tasks, wherein a first task includes a first operation from the set of operations, the first operation being performed on a first window from the set of windows;

determining, by the first model, an order to organize the plurality of tasks;

providing the set of windows and the plurality of task in the order on a user interface;

calculating, by the first model, a level score for the first operation of the first window for the first task;

assembling the user manual, wherein the user manual comprises the plurality of tasks in the order and the first operation of the first task is at a level based on the level score; and outputting the user manual, wherein the user manual includes at least two levels.

17. The computer program product of claim 16, wherein the first model is trained to identify the set of operations in the program and wherein the program instructions are further configured to cause the processing unit to perform a method further comprising:

training a second model wherein the second model is trained by a second set of training data, wherein the second model is trained to identify the set of windows.

18. The computer program product of claim 17, wherein the program instructions are further configured to cause the processing unit to perform the method further comprising:

training a third model, wherein the third model is trained by a third set of training data, wherein the third model is trained to determine the order for the plurality of tasks and to calculate the level score for the first operation.

19. The computer program product of claim 16 wherein the first model is trained to calculate the level score for the first operation of each of the plurality of tasks.

20. The computer program product of claim 16, wherein the program instructions are further configured to cause the processing unit to perform the method further comprising:

removing, from the user manual, one or more tasks from the plurality of tasks.

* * * * *